(No Model.)
P. BROWN.
SEED POTATO CUTTER.
No. 532,228.   Patented Jan. 8, 1895.
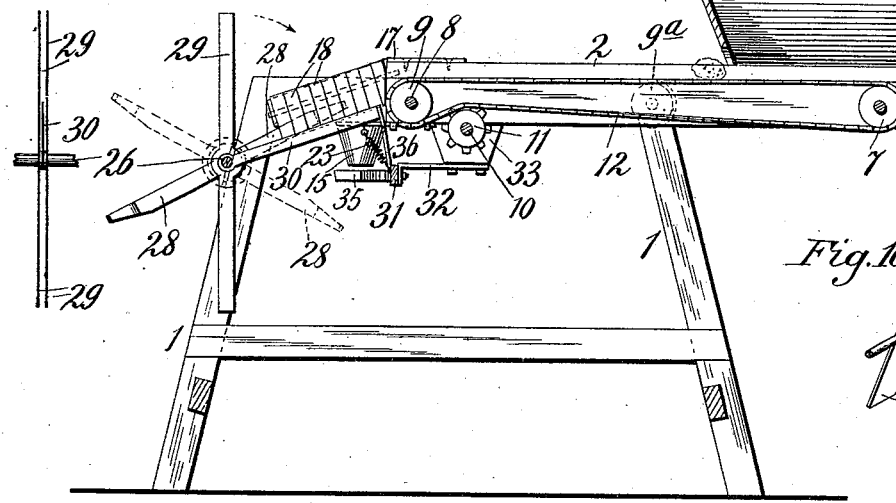
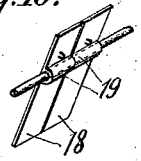
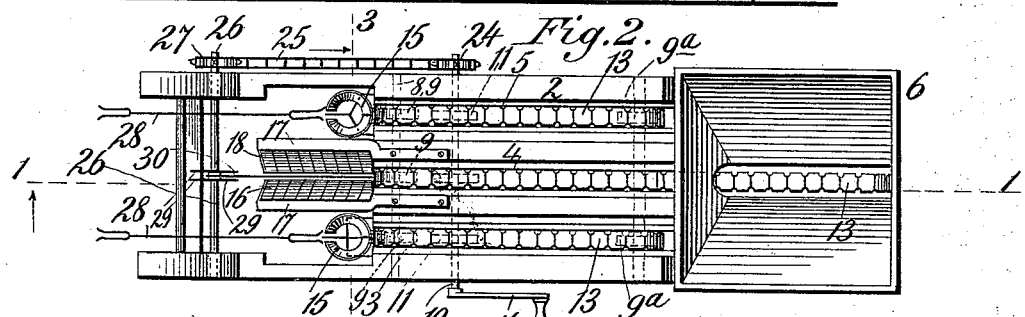
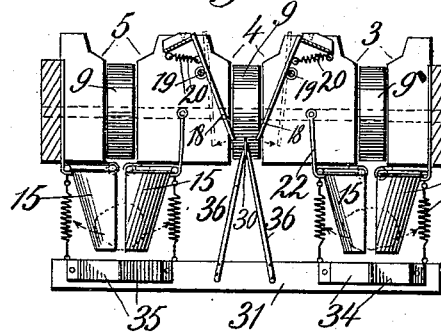
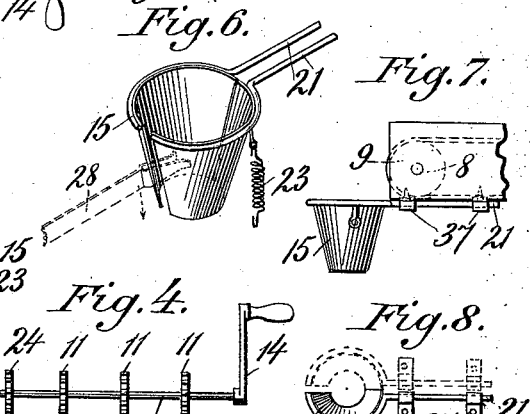
Attest:
F. H. Schott
Alfred T. Gage
Inventor:
Peter Brown

UNITED STATES PATENT OFFICE.

PETER BROWN, OF GREELEY, COLORADO.

SEED-POTATO CUTTER.

SPECIFICATION forming part of Letters Patent No. 532,228, dated January 8, 1895.

Application filed April 5, 1894. Serial No. 506,443. (No model.)

*To all whom it may concern:*

Be it known that I, PETER BROWN, a citizen of the United States, residing at Greeley, in the county of Weld and State of Colorado, have invented certain new and useful Improvements in Seed-Potato Cutters; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to seed potato cutters, and has for its object to produce a machine of the character named in which the potatoes can be assorted according to size and fed to a series of cutters adapted to cut the potatoes into sections of approximately the same size thus enabling the same machine to act on potatoes of various sizes to divide them into approximately sections of the same dimensions for planting purposes.

It has also for its object to provide a trough or hopper adapted to receive and adjust itself to potatoes of different sizes so that a potato of a given size can be forced through the hopper without potatoes of other sizes passing through the openings necessary for the potatoes of the larger size, that is, the trough may contain potatoes of different sizes and will adjust itself at various points of its dimensions correspondingly to the size of the potato that may lie against the side at a particular point so that a potato of one size will pass through it at one point while a potato of another size will pass through it at a different point thus preventing the potatoes of a smaller size passing through at the point where the larger potatoes pass through which if permitted would cause the smaller potatoes to pass to one side of the knives without being cut or sliced.

It has also for its object to provide advantageous features of construction and of combination in different parts of the machine whereby the machine as a whole is rendered more efficient and more satisfactory in the work it is to perform.

To the accomplishment of the foregoing and such other objects as may hereinafter appear, the invention consists in the construction and also in the combination of parts hereinafter particularly described and then sought to be specifically defined by the claims, reference being had to the accompanying drawings, forming a part hereof, and in which—

Figure 1 is a vertical section through the machine with parts in full lines. Fig. 2 is a plan view of the machine. Fig. 3 is a cross section on the line 3—3 of Fig. 2. Fig. 4 is a front view of the crank shaft and sprocket wheels thereon in perspective. Fig. 5 is a perspective of two of the cutters or slicing knives. Fig. 6 is a perspective of one of the hoppers. Fig. 7 is a side view of one of the hoppers showing a portion of the frame of the machine and manner of pivoting the hopper. Fig. 8 is a plan view of one of the hoppers and its journals showing one section of the hopper in dotted lines. Fig. 9 is an end view of one of the presser arms. Fig. 10 is a perspective of a portion of one side of the central hopper; and Fig. 11 is a plan view of one of the end hoppers showing the cutter and presser arm.

In the annexed drawings the numeral 1 designates the frame of any suitable construction provided at its top with a table 2 divided into a series of longitudinal channels, for instance 3, 4 and 5, having at one end a hopper 6 slotted in its bottom, and adapted to permit potatoes deposited therein to pass through the front and be carried forward by a chain or other belt 12 suitable for the purpose. The chain 12 passes under the hopper as indicated clearly in Figs. 1 and 2 and at one end passes around a pulley 7 and at the other end around one of a series of pulleys 9 mounted upon a shaft 8 suitably journaled, and travels in the central channel 4 as illustrated. In each of the channels 3 and 5 there travels a similar belt or carrier 13 which at one end passes around pulleys, and at the other end around two of the pulleys 9 mounted upon the shaft 8 in a manner similar to chain belt 12. These several belts are caused to travel by means of sprocket wheels 11 mounted upon shaft 10 and engaging with the several chains, the shaft being rotated by means of the crank handle 14. At one end of each of the two carrier belts 13 there is a hopper 15 adapted to receive the potatoes that may be carried to them by the carrier belts 13. Each of these hoppers is made sectional in vertical lines and preferably is made of funnel shaped or tapering form but may be of any other suitable shape. Each section of the hopper is formed with a laterally extending arm or journal 21 which passes through suitable boxes 37 attached to the under side of the machine so that the sections of each hopper may spread as its journal turns in its boxes. The sections of each hopper are held normally in a closed position by means of suitable springs for instance by the coil springs 23 which may be attached at one end in a suitable manner to each section of the hopper and at the other end to any suitable part of the machine for instance to a cross bar 31 as clearly illustrated in Fig. 3 of the drawings. When the lower ends of the hopper are distended by a potato passing through the same the springs 23 will allow the sections to yield for that purpose and after the potato passes through these springs will retract the sections of the hoppers to their normal positions. These hoppers are further sustained in place preferably by means of hooks 22 or their equivalents attached at one end to a suitable part of the frame of the machine and having their lower ends hooked so as to pass under the beaded rim or top edge of each section of each hopper as illustrated in Fig. 3.

At one end of the chain carrier 12 there is arranged a trough or hopper 16 having its side walls composed of a series of independently operatable spring fingers or plates 18. These fingers are preferably formed of plates set edge to edge and journaled upon suitable rods 19 sustained by the frame, and are held in their normal positions by means of suitable springs, for instance, by coil springs 20 attached at one end one to each of the fingers and at the other end to a suitable part of the machine. These springs allow the lower ends of the fingers to be pressed out independently and after the pressure is released the springs throw the lower ends inwardly into their normal position. The fingers are arranged to stand normally in an inclined position as illustrated in Figs. 2 and 3 so as to present a V-shaped trough or hopper, and their upper ends in their normal position will bear against arms 17 extending from a suitable part of the machine, for instance, from the table as illustrated in Fig. 2 so that by the upper ends of the fingers bearing against these arms the fingers are prevented from being thrown too far inward at their lower ends by the recoil of the springs 20. The purpose of making these fingers independently operatable is to permit a potato of a given size to pass from the trough or hopper at one point without permitting a potato of a smaller size to pass therefrom through the same opening which would cause the smaller potatoes to pass to one side of the knives or cutters hereinafter described which if permitted would prevent the potato from being cut or sliced. The fingers however against which the smaller potatoes rest will yield to the pressure at such point so as to permit the potatoes to pass therethrough. It will thus be seen that the sides of the hopper or trough adjust themselves to an extent corresponding to the size of the potato to pass through the trough at any particular point and by this means all the potatoes are caused to pass through the trough although they be of different sizes at such a point where they will be brought in contact with the cutters or slicers which are placed beneath the hopper or trough.

The purpose of providing a series of carriers for the potatoes and providing each carrier with an independent hopper is to enable the potatoes which are placed promiscuously in the hopper 6 so far as size is concerned to be assorted and each grade to be carried through its respective hopper provided with a cutter or slicer having blades sufficient to cause each potato delivered by the several carriers to be cut or sliced into approximately the same size so that the product of the three or more hoppers will be the same size and from which better results are obtained in the planting and growth of the potatoes. The number of blades to each cutter will depend upon the dimensions of the several hoppers and will bear the same relation to the size or grade of potatoes fed to their respective hoppers. For instance, the hopper to one of the carriers is shown in Fig. 2 to be provided with four cutting edges so as to slice the potatoes into four parts while the carrier at the opposite side of the machine is shown as provided with three cutters or cutting edges as the potatoes sent to that hopper will be smaller than those fed to the first hopper, and the cutter or knife provided for the hopper or trough has a single cutting edge as the potatoes fed to it will be merely cut in half, or into two parts as the smaller potatoes will be fed to that hopper or trough.

The grading of the potatoes is effected by the operator selecting the larger potatoes carried by the chain belt 12 from the hopper and throwing these larger potatoes according to their size into the channels 3 and 5 and from which they will be moved by the belts provided for those channels to the hoppers.

The cutters or knives may be of any suitable form and supported in any suitable manner beneath the several hoppers. As a suitable construction for the purpose I have illustrated the bar 31 supported by one or more rods 32 attached to one or more brackets 33 of the machine and have illustrated at one end of the bar 31 a cutter 35 formed with three cutting edges or blades adapted to cut or slice the potato into three parts while at the other end of the bar, I have illustrated a cutter or knife having a sufficient number of cutting edges to slice the potato into four parts. For the central hopper or trough 16 I have illustrated a single blade lying between the two walls of the hopper or trough at its lower end and supported by suitable brackets 36 and at the other end attached to the shaft 26 in a manner that will permit the shaft to turn without affecting the knife. This finger blade serves to divide or slice the potato into two parts. It is obvious however that the number of cutting edges to the cutting blades or knives can be increased or decreased as may be desired.

For the purpose of pressing the potatoes from the several hoppers and pressing them against the knives or cutters below the hoppers, I provide a series of arms 28 and 29, attached to the shaft 26. The arms 28 are preferably formed with forks at opposite ends as illustrated clearly in Fig. 2 so that they can bear more firmly against the potatoes in the hoppers, the said arms being adapted in their rotation to pass through the hoppers in the dividing space between the sections of each hopper and to pass down from the top to the bottom of the hopper thus pressing the potatoes against the knives or cutters beneath the several hoppers. The presser arm 29 for the middle hopper or trough is preferably formed of two parallel members which will pass on opposite sides of the fixed cutter or knife 30 for that hopper or trough. While these are the preferred forms of construction of presser arms other forms may be adopted without departing from this feature of my invention. These arms 28 and 29 are preferably mounted upon the shaft 26 so that they will enter their respective hoppers in consecutive order, that is, so that they will not all enter at the same time. This gives an opportunity to effect a grading of the potatoes and of feeding the same to the several hoppers in advance of the time that the presser arm enters the hopper. The arrangement shown in the drawings will permit of that operation.

Rotation is given to the shaft 26 by a sprocket wheel 27 mounted thereon and connected by a sprocket chain 25 with a sprocket wheel 24 on the crank shaft. By this arrangement the carriers and the presser arms are operated by the shaft 10 and crank handle 14.

It will be observed that the blades cut or slice the potato in radial lines from the center to the circumference of the potato.

Having described my invention and set forth its merits, what I claim is—

1. In a seed potato cutter, the combination of a series of potato-carriers, a hopper for each carrier to receive the potatoes each from its respective carrier, and a cutter to each hopper, the several cutters having a different number of cutting edges to adapt the several cutters to slice the potatoes fed thereto into slices of approximately the same dimensions, substantially as and for the purposes described.

2. In a seed potato cutter, the combination of a seed hopper, a series of potato-carriers, one of said carriers passing beneath said feed hopper, a receiving hopper for each carrier to receive the potatoes each from its respective carrier, and a cutter to each hopper, the several cutters having a different number of cutting edges to adapt the several cutters to slice the potatoes fed to the several cutters into slices of approximately the same dimensions, substantially as and for the purposes described.

3. In a seed potato cutter, a hopper having its side walls formed of a series of independently operatable fingers controlling the discharge opening of the hopper so that said opening will be adjusted in size corresponding to the size of the potato passing through it at any given point in its length without affecting its adjustment at other points, substantially as and for the purposes described.

4. In a seed potato cutter, the combination of a series of potato-carriers, a hopper for each carrier to receive the potatoes each from its respective carrier, a cutter to each hopper, the several cutters having a different number of cutting edges to adapt the several cutters to slice the potatoes fed therethrough into slices of approximately the same dimensions, and rotatable presser arms adapted in their rotation to pass through the hoppers to press the potatoes therein against the cutters, substantially as and for the purposes described.

5. In a potato cutter, the combination of a series of potato-carriers, a hopper for each carrier to receive the potatoes each from its respective carrier, a cutter to each hopper, the several cutters having a different number of cutting edges to adapt the several cutters to slice the potatoes fed therethrough into slices of approximately the same dimensions, and rotatable presser arms arranged to pass consecutively each through its respective hopper to press the potatoes in the hopper against the cutters, substantially as and for the purposes described.

6. In a seed potato cutter, the combination of a series of potato-carriers, a hopper for each carrier to receive the potatoes each from its respective carrier, a cutter for each hopper, a rotatable presser arm to each hopper to press the potatoes therein against the cutters, a power shaft having connection with said carriers to move the same, and means connecting said power shaft with the rotatable presser arms to rotate the latter, substantially as and for the purposes described.

In testimony whereof I affix my signature in presence of two witnesses.

PETER BROWN.

Witnesses:
EDGAR E. CLARK,
WM. H. THOMPSON.